United States Patent
Kang et al.

(10) Patent No.: US 9,847,146 B2
(45) Date of Patent: Dec. 19, 2017

(54) ANTI-SEISMIC APPARATUS FOR CONTROL ELEMENT DRIVE MECHANISMS

(71) Applicant: KEPCO ENGINEERING & CONSTRUCTION COMPANY, INC., Yongin-si, Gyeonggi-do (KR)

(72) Inventors: Tae Kyo Kang, Daejeon (KR); Yeon Ho Cho, Daejeon (KR); Sung Jun Kim, Daejeon (KR); Jong Sang Won, Cheongju-si (KR); Sang Gyoon Chang, Daejeon (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 630 days.

(21) Appl. No.: 14/580,992

(22) Filed: Dec. 23, 2014

(65) Prior Publication Data

US 2016/0365160 A1   Dec. 15, 2016

(30) Foreign Application Priority Data

Aug. 8, 2014  (KR) ......................... 10-2014-0102629

(51) Int. Cl.
*G21C 19/06* (2006.01)
*G21C 7/20* (2006.01)
(Continued)

(52) U.S. Cl.
CPC ............... *G21C 7/20* (2013.01); *E04H 15/62* (2013.01); *G21C 13/024* (2013.01); *E04H 9/021* (2013.01);
(Continued)

(58) Field of Classification Search
CPC .......... G21C 13/024; G21C 9/04; G21C 7/20; E04H 9/021; G21Y 2002/303; Y02E 30/39; Y02E 30/40
(Continued)

(56) References Cited

U.S. PATENT DOCUMENTS 2,614,157 A * 10/1952 Montgomery ......... G01V 13/00
                                                              174/541
3,205,144 A *  9/1965 Jabsen ..................... G21C 7/27
                                                              376/267
(Continued)

FOREIGN PATENT DOCUMENTS

CN    101573766 A    11/2009
CN    103050154 A     4/2013
(Continued)

OTHER PUBLICATIONS

Korean Office Action for Korean Application No. 10-2014-0102629, dated May 15, 2015, 20 pages.
(Continued)

*Primary Examiner* — Jack W Keith
*Assistant Examiner* — Daniel Wasil
(74) *Attorney, Agent, or Firm* — Nixon Peabody LLP; Anthony M. Duncan, Jr.

(57) ABSTRACT

An anti-seismic apparatus for control element drive mechanisms of a nuclear reactor includes: an anti-seismic support plate including a plurality of insertion holes in which the control element drive mechanisms are respectively inserted; and bushings inserted between outer surfaces of the control element drive mechanisms and inner surfaces of the insertion holes. The support plate includes an upper support plate comprising a plurality of first insertion holes, a lower support plate comprising a plurality of second insertion holes at positions corresponding to the first insertion holes,
(Continued)

and a connection part connecting the upper support plate and the lower support plate. The connection part includes a support beam vertically extending from an end portion of the lower support plate, an inner flange extending inward from an upper end portion of the support beam, and an outer flange extending outward from the upper end portion of the support beam.

15 Claims, 9 Drawing Sheets

(51) Int. Cl.
*G21C 13/024* (2006.01)
*E04H 15/62* (2006.01)
*G21C 9/04* (2006.01)
*E04H 9/02* (2006.01)

(52) U.S. Cl.
CPC .......... *G21C 9/04* (2013.01); *G21Y 2002/303* (2013.01); *Y02E 30/39* (2013.01)

(58) Field of Classification Search
USPC .................................................. 376/277, 285
See application file for complete search history.

(56) References Cited

U.S. PATENT DOCUMENTS

| | | | |
|---|---|---|---|
| 3,752,737 A * | 8/1973 | Frisch | G21C 9/001 |
| | | | 376/263 |
| 3,836,430 A | 9/1974 | Frisch et al. | |
| 4,678,623 A | 7/1987 | Malandra et al. | |
| 4,830,814 A | 5/1989 | Altman | |
| 5,225,150 A | 7/1993 | Malandra et al. | |
| 5,384,812 A | 1/1995 | Meuschke et al. | |
| 5,715,288 A | 2/1998 | Matteson | |
| 5,742,652 A | 4/1998 | Hankinson et al. | |
| 5,774,513 A | 6/1998 | Urko | |
| 5,930,321 A | 7/1999 | Harkness et al. | |
| 6,061,415 A | 5/2000 | Harkness et al. | |
| 6,546,066 B2 | 4/2003 | Baliga et al. | |
| 6,639,960 B2 | 10/2003 | Harkness et al. | |
| 2003/0026376 A1 | 2/2003 | Baliga et al. | |
| 2003/0026377 A1 | 2/2003 | Baliga et al. | |
| 2010/0098205 A1* | 4/2010 | Kang | G21C 13/02 |
| | | | 376/263 |
| 2012/0014493 A1 | 1/2012 | Frank et al. | |
| 2014/0301523 A1* | 10/2014 | Son | G21C 13/024 |
| | | | 376/277 |

FOREIGN PATENT DOCUMENTS

| | | |
|---|---|---|
| CN | 103069499 A | 4/2013 |
| CN | 103871496 A | 6/2014 |
| FR | 2704679 B1 | 8/1995 |
| JP | 63315983 A | 12/1988 |
| KR | 10-1984-0000942 A | 3/1984 |
| KR | 10-1999-0085689 A | 12/1999 |
| KR | 10-2000-0071419 A | 11/2000 |
| KR | 10-2000-0074957 A | 12/2000 |
| KR | 10-2008-0060667 A | 7/2008 |
| KR | 10-0844439 B1 | 7/2008 |
| WO | 2011093578 A1 | 8/2011 |

OTHER PUBLICATIONS

Notice of Allowance for Korean Patent Application No. 10-2014-0102629, dated Aug. 31, 2015.
Office Action dated May 15, 2017 of Chinese Patent Application No. 201410826585.2.

* cited by examiner

ANTI-SEISMIC APPARATUS FOR CONTROL ELEMENT DRIVE MECHANISMS

RELATED APPLICATION

This application claims the benefit of Korean Patent Application No. 10-2014-0102629, filed on Aug. 8, 2014, in the Korean Intellectual Property Office, the disclosure of which is incorporated herein in its entirety by reference.

BACKGROUND

1. Field

One or more embodiments relate to an anti-seismic apparatus for control element drive mechanisms, and more particularly, to an anti-seismic apparatus for supporting a plurality of control element drive mechanisms using an integral anti-seismic support plate to prevent excessive transverse movements of the control element drive mechanisms.

2. Description of the Related Art

Control element drive mechanisms are used to control the reactivity of nuclear fuel in a reactor core. Control element drive mechanisms vertically lift or lower control elements (control rods) for taking the control elements out of the reactor core or inserting the control elements into the reactor core.

FIG. 1 illustrates reactor upper structures of the related art, and FIG. 2 illustrates main parts of FIG. 1.

Referring to FIG. 1, various structures are disposed on an upper side of a reactor head, and such structures are called reactor upper structures. Examples of the reactor upper structures include a cooling fan for cooling control element drive mechanisms, a shroud shell for accommodating the reactor upper structures and providing cooling-air flow passages, a lifting device for lifting the reactor upper structures, a cable device for supplying power to the control element drive mechanisms, and an anti-seismic apparatus for the anti-seismic design of the control element drive mechanisms.

Referring to FIG. 2, a plurality of control element drive mechanisms are illustrated. In the related art, anti-seismic apparatuses for control element drive mechanisms are constructed by individually installing anti-seismic support plates on the control element drive mechanisms to transmit a load through contact between neighboring anti-seismic support plates and restrict transverse movements of the control element drive mechanisms.

However, such anti-seismic support plates disposed at respective control element drive mechanisms may make manufacturing and installing processes inconvenient.

In addition, if anti-seismic support plates are individually installed on respective control element drive mechanisms as in the related art, due to thermal expansion of the anti-seismic support plates, the control element drive mechanisms may be inclined, or neighboring anti-seismic support plates may not be horizontally aligned with each other. Furthermore, since gaps between the anti-seismic support plates are not always constant, impactive forces may not be stably transmitted during earthquakes.

SUMMARY

One or more embodiments include an anti-seismic apparatus for supporting a plurality of control element drive mechanisms using an integral anti-seismic support plate to prevent excessive transverse movements of the control element drive mechanisms.

Additional aspects will be set forth in part in the description which follows and, in part, will be apparent from the description, or may be learned by practice of the presented embodiments.

According to one or more exemplary embodiments, an anti-seismic apparatus is provided for an anti-seismic design of a plurality of control element drive mechanisms of a nuclear reactor, the anti-seismic apparatus including: an anti-seismic support plate including a plurality of insertion holes in which the control element drive mechanisms are respectively inserted; and bushings inserted between outer surfaces of the control element drive mechanisms and inner surfaces of the insertion holes.

The anti-seismic support plate may include: an upper support plate including a plurality of first insertion holes; a lower support plate including a plurality of second insertion holes at positions corresponding to the first insertion holes, the lower support plate being disposed under the upper support plate with a gap therebetween; and a connection part connecting the upper support plate and the lower support plate.

The connection part may be a flange formed in one piece with the lower support plate.

The connection part may include: a support beam vertically extending from an end portion of the lower support plate; an inner flange extending inward from an upper end portion of the support beam; and an outer flange extending outward from the upper end portion of the support beam.

The insertion holes may include slots in which terminal boxes accommodating electric wires extending outward from the control element drive mechanisms may be inserted.

Each of the bushings may include: a rest part placed on an upper surface of the anti-seismic support plate; and an insertion part extending downward from the rest part and inserted into the insertion hole, each of the inner surfaces of the bushings may include: a first inner diameter part formed on an upper side and having a first inner diameter; and a second inner diameter part disposed below the first inner diameter part and having a second inner diameter that is smaller than the first inner diameter, wherein a rest surface may be formed between the first inner diameter part and the second inner diameter part.

A slope may be formed on a lower end inner surface of each of the bushings to form a downwardly increasing inner diameter.

Each of the bushings may include an opening in a side thereof.

The rest part and the anti-seismic support plate may be bolted together.

The upper support plate may be placed on the inner flange and coupled to the inner flange, and a shroud shell disposed around the upper support plate to accommodate reactor upper structures provided on an upper side of the nuclear reactor may be placed on the outer flange and coupled to the outer flange.

The upper support plate and the inner flange may be bolted together, and the shroud shell and the outer flange may be bolted together.

A first anti-seismic support ring beam may be disposed under the outer flange along a circumference of the lower support plate, and a second anti-seismic support ring beam may be disposed under the first anti-seismic support ring beam.

A reinforcement plate may be inserted between the first anti-seismic support ring beam and the second anti-seismic support ring beam.

The anti-seismic apparatus of may further include an anti-seismic support, the anti-seismic support may have an end portion coupled between the first and second anti-seismic support ring beams and the other end portion coupled to a wall surrounding the nuclear reactor.

A first air passage may be formed in the lower support plate and the connection part, and a second air passage communicating with the first air passage may be formed in the upper support plate.

An inner surface of the second inner diameter part and the outer surface of the control element drive mechanism may be spaced apart from each other to allow thermal expansion.

A gasket may be placed on the rest surface in such a manner that an outer surface of the gasket may make contact with an inner surface of the first inner diameter part and an inner surface of the gasket may make contact with the outer surface of the control element drive mechanism.

The anti-seismic support may include: a lug coupled between the first anti-seismic support ring beam and the second anti-seismic support ring beam; an upper clevis coupled to the lug by a first pin and including a first joint hole on which a screw thread is formed in a first direction; a support rod having an end portion coupled to the first joint hole; a lower clevis to which the other end portion of the support rod is coupled, the lower clevis including a second joint hole on which a screw thread is formed in a direction opposite to the first direction; a bracket fixed to the wall surrounding the nuclear reactor, the lower clevis being coupled to the bracket by a second pin; and length adjustment nuts respectively coupled to the end portion and the other end portion of the support rod.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
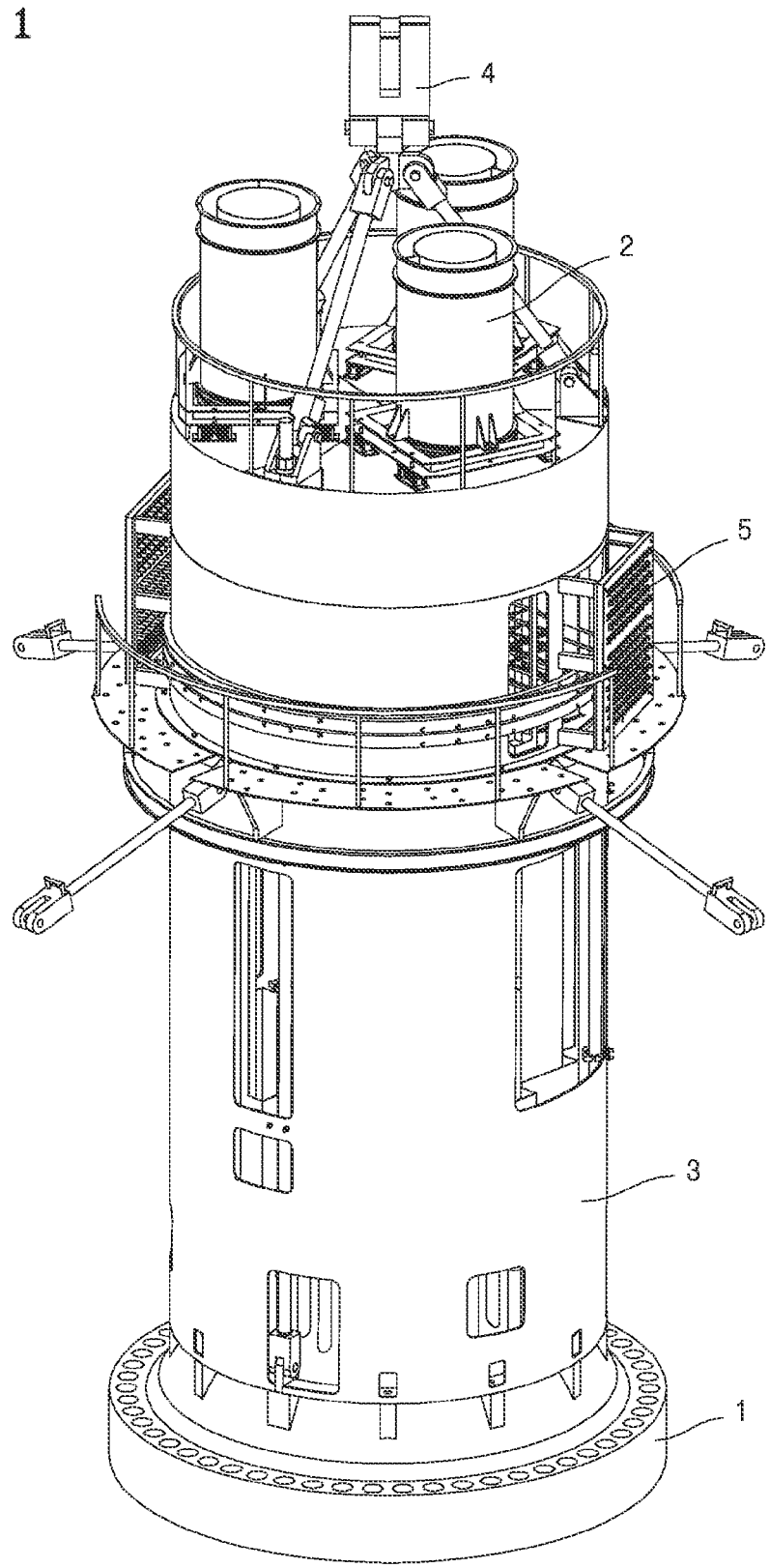
FIG. 1 is a perspective view illustrating reactor upper structures in the related art.
Figure 2:
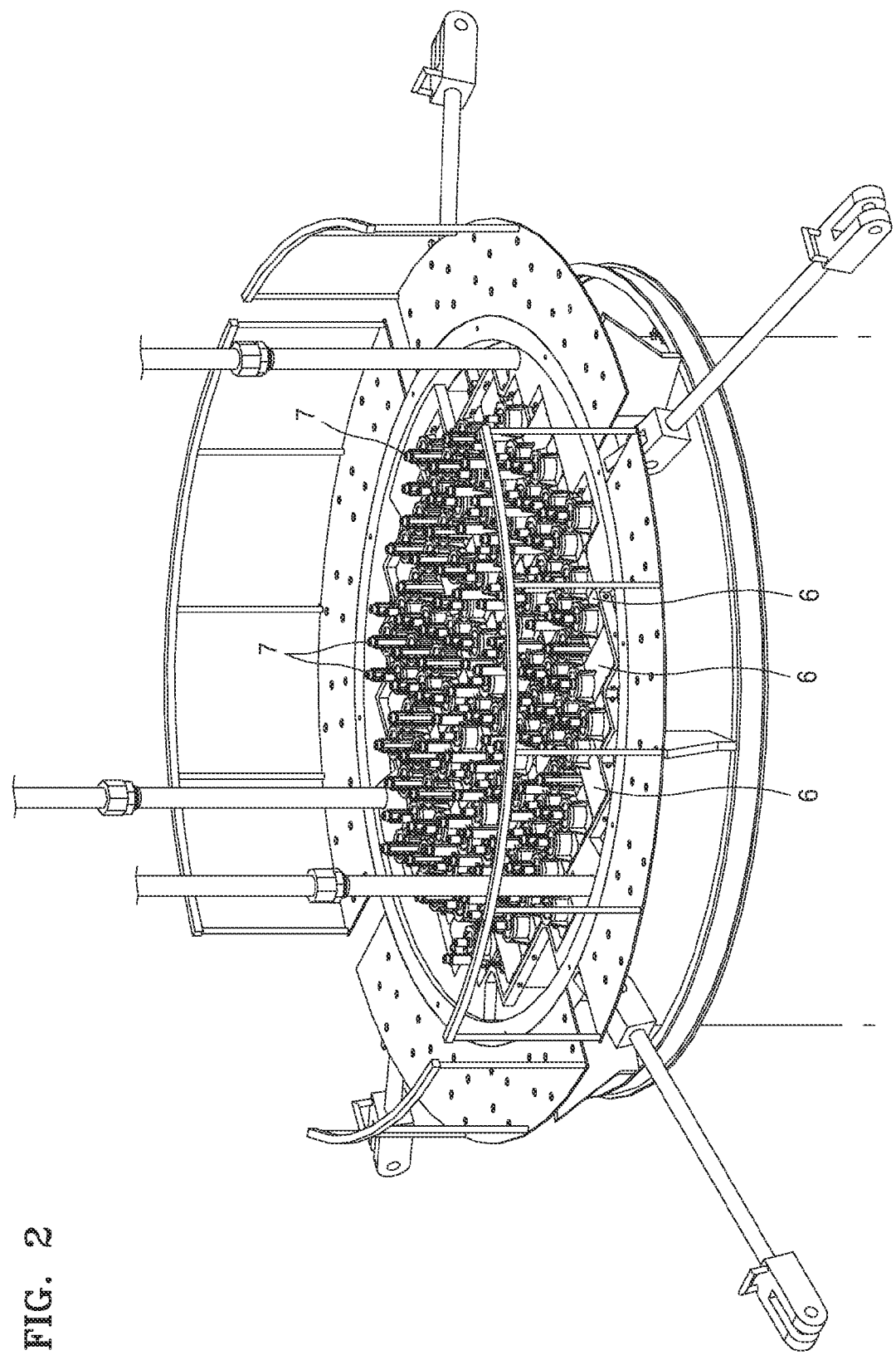
FIG. 2 is a view illustrating main parts of FIG. 1.

Hereinafter, embodiments will be described with reference to the accompanying drawings.

Advantages and features of the embodiments, and implementation methods thereof will be clarified through the following descriptions given with reference to the accompanying drawings. The embodiments may, however, have different forms and should not be construed as being limited to the descriptions set forth herein. Rather, these embodiments are provided so that this disclosure will be thorough and complete, and will fully convey the scope of the inventive concept to those skilled in the art. Therefore, the scope of the inventive concept should be defined by the following claims. Throughout the present disclosure, like reference numerals denote like elements.

In the following description, technical terms are used only for explaining exemplary embodiments, and not for purposes of limitation. The terms of a singular form may include plural forms unless specifically mentioned. In the following description, the terms "comprises" and/or "comprising" specify the presence of stated features or components, but do not preclude the presence or addition of one or more other features or components.

Unless otherwise defined, all terms (including technical and scientific terms) used herein have the same meaning as commonly understood by those of ordinary skill in the related art.

Figure 3:
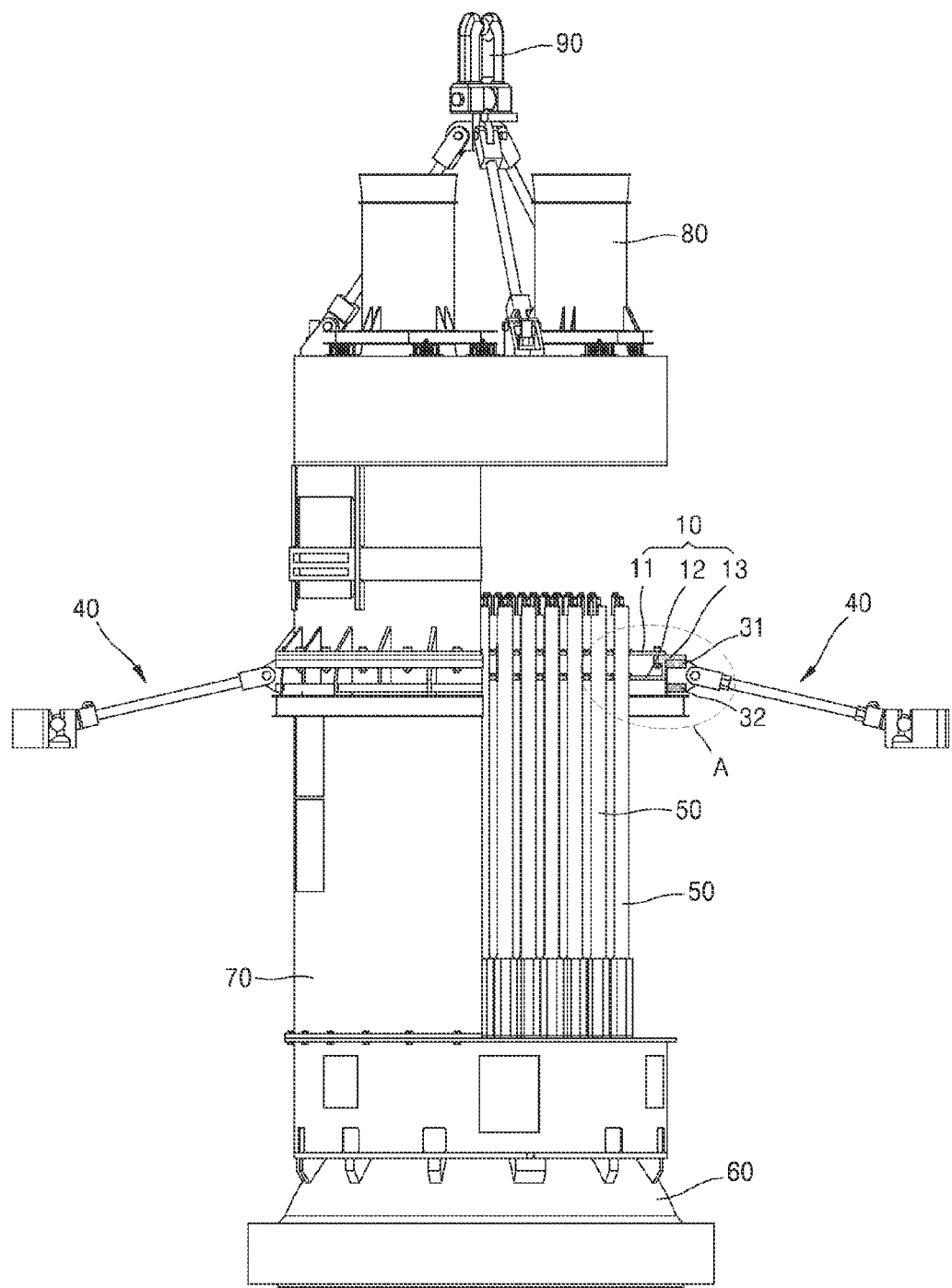
FIG. 3 is a view illustrating reactor upper structures in which an anti-seismic apparatus for control element drive mechanisms is included, according to an embodiment.
Figure 4:
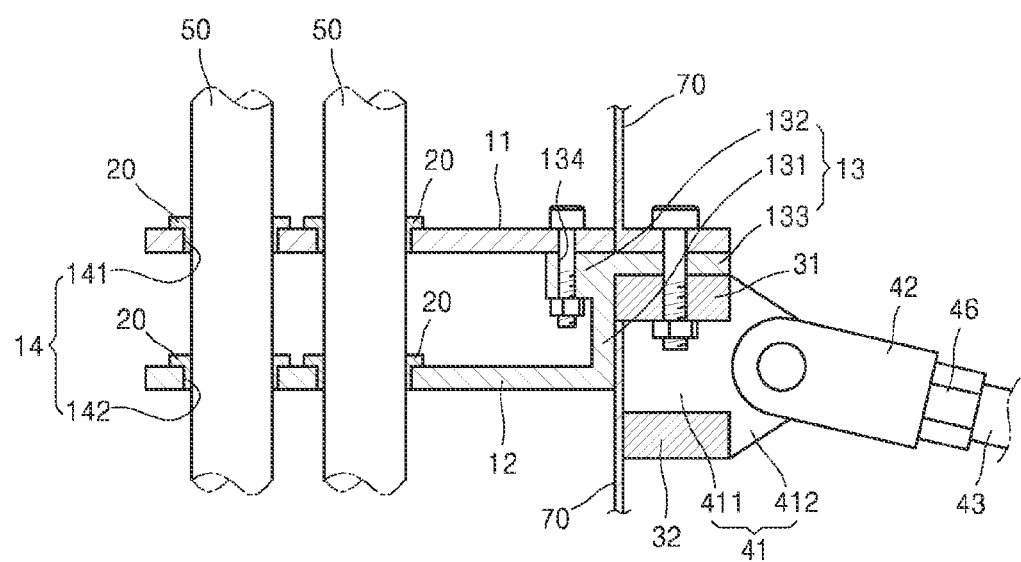
FIG. 4 is an enlarged view illustrating a region A in FIG. 3.
Figure 5:
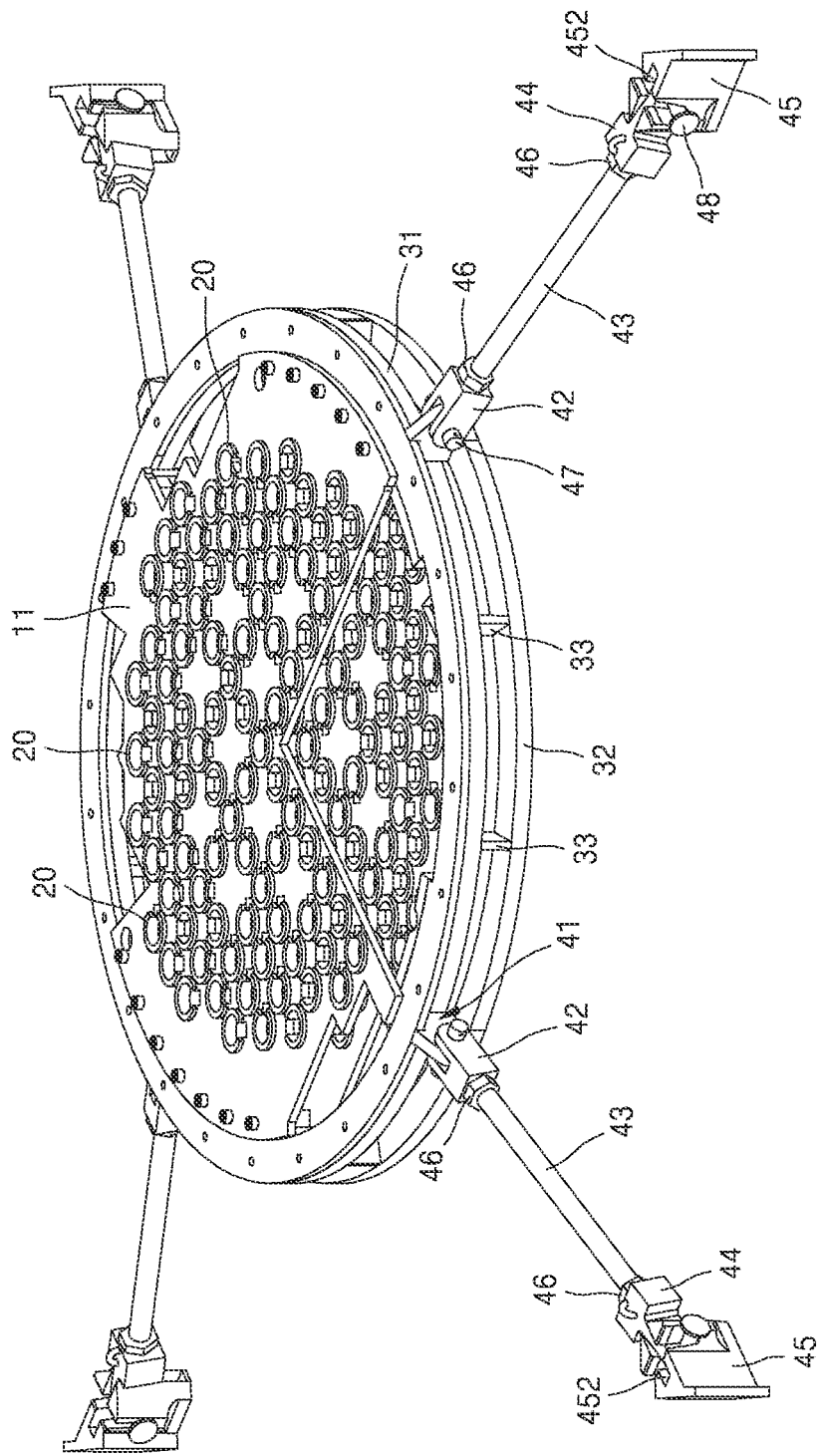
FIG. 5 is a view illustrating main parts of FIG. 3.
Figure 6:
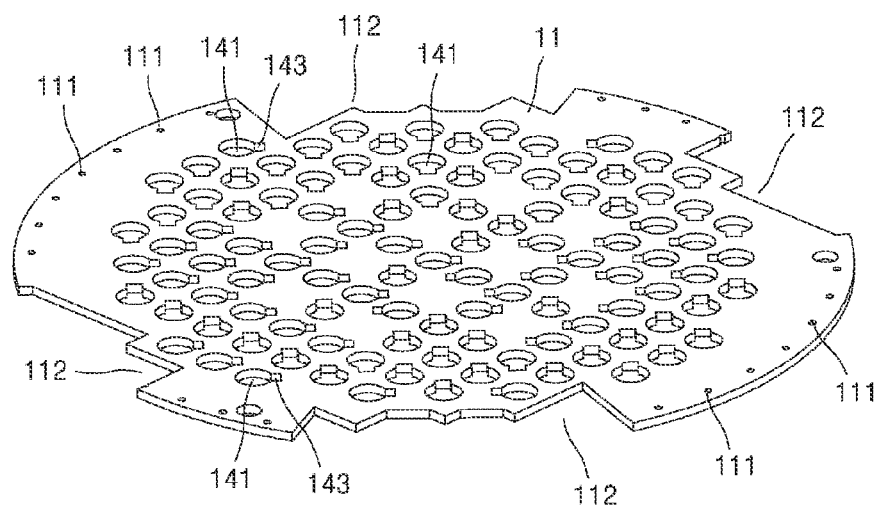
FIG. 6 is a view illustrating an upper support plate.
Figure 7:
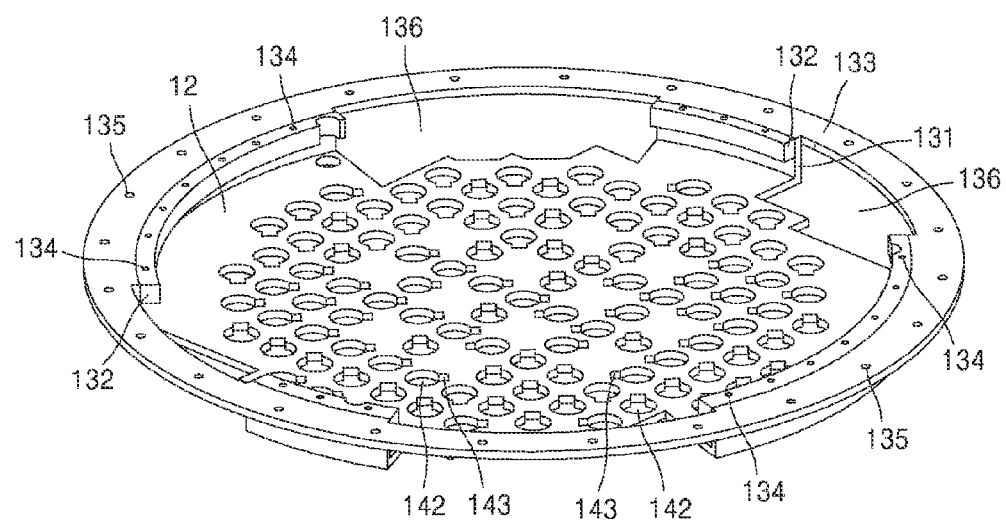
FIG. 7 is a view illustrating a lower support plate and a connection part.
Figure 8:
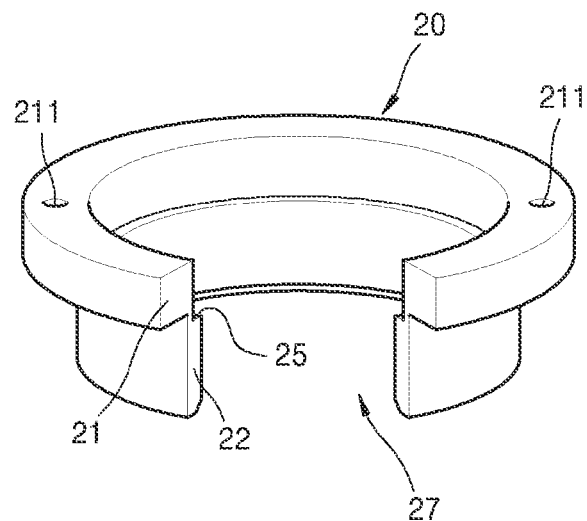
FIG. 8 is a view illustrating a bushing.
Figure 9:
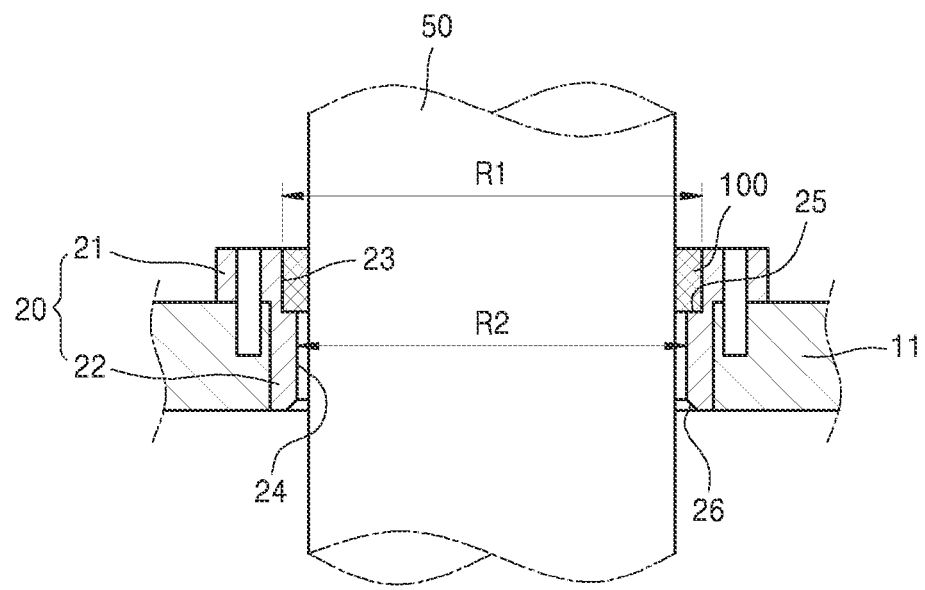
FIG. 9 is a cross-sectional view illustrating a state in which a control element drive mechanism is inserted in the upper support plate or the lower support plate.
Figure 10:
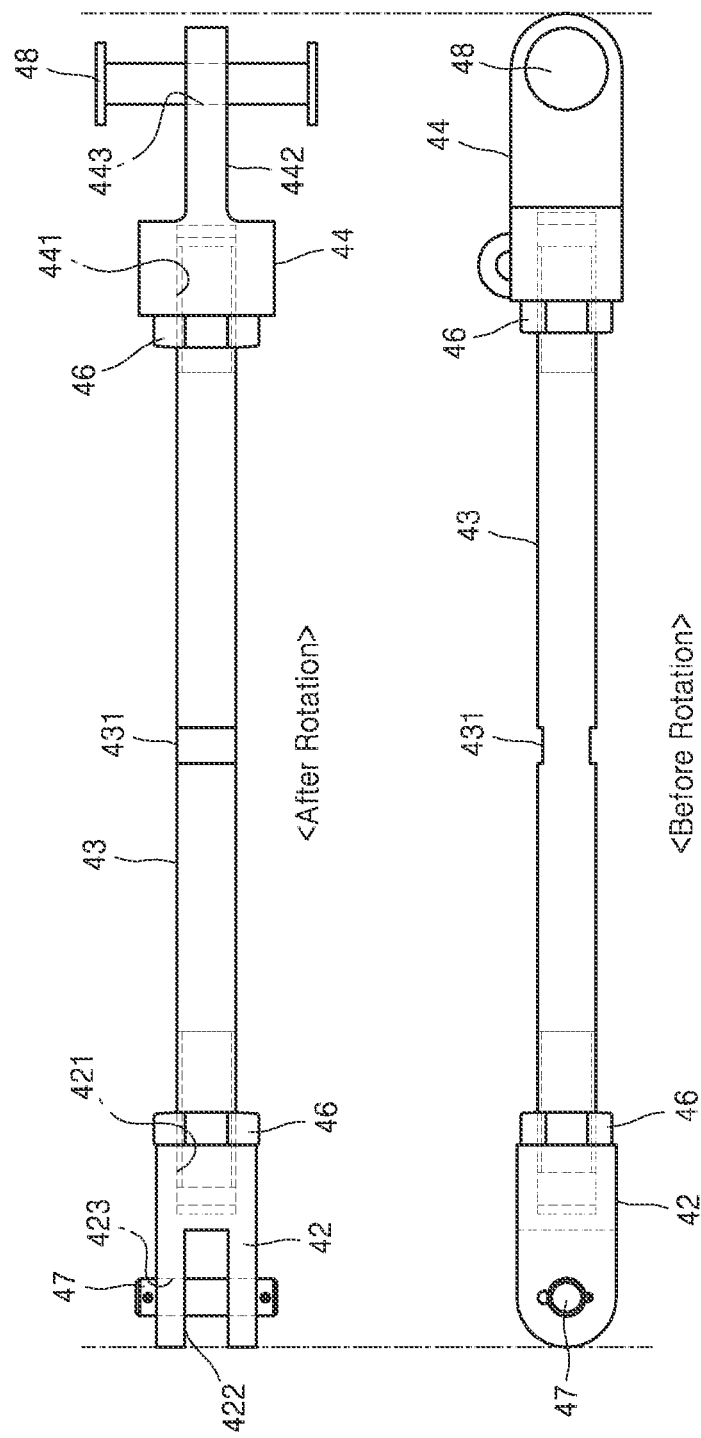
FIG. 10 is a view illustrating operations of an anti-seismic support.
Figure 11:
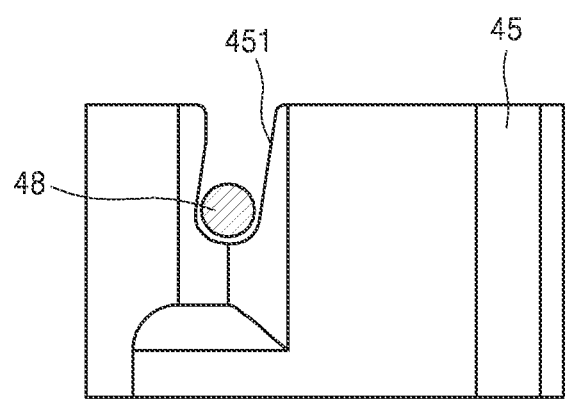
FIG. 11 is a view illustrating main parts of FIG. 5.

FIG. 3 is a view illustrating reactor upper structures in which an anti-seismic apparatus for control element drive mechanisms is included, according to an embodiment. FIG. 4 is an enlarged view illustrating a region A in FIG. 3, and FIG. 5 is a view illustrating main parts of FIG. 3. FIG. 6 is a view illustrating an upper support plate 11, FIG. 7 is a view illustrating a lower support plate 12 and a connection part 13, and FIG. 8 is a view illustrating bushings 20. FIG. 9 is a cross-sectional view illustrating a state in which a control element drive mechanism is inserted in the upper support plate 11 or the lower support plate 12. FIG. 10 is a view illustrating operations of an anti-seismic support, and FIG. 11 is a view illustrating main parts of FIG. 5.

As shown in FIG. 3, the anti-seismic apparatus of the embodiment is provided for the anti-seismic design of a plurality of control element drive mechanisms 50 disposed in a nuclear reactor. The anti-seismic apparatus includes an anti-seismic support plate 10 and the bushings 20.

The anti-seismic support plate 10 includes a plurality of insertion holes 14 in which the control element drive mechanisms 50 are respectively inserted. That is, the anti-seismic support plate 10 is provided in the form of an integral plate, and the control element drive mechanisms 50 are respectively inserted in the insertion holes 14 and supported by the anti-seismic support plate 10. In the current embodiment, the insertion holes 14 include slots 143. Terminal boxes accommodating electric wires extending outward from the control element drive mechanisms 50 are inserted in the slots 143.

In the current embodiment, the anti-seismic support plate 10 includes the upper support plate 11, the lower support plate 12, and the connection part 13.

Referring to FIGS. 4 and 6, the upper support plate 11 is disposed above the lower support plate 12 and includes a plurality of first insertion holes 141 in which the control element drive mechanisms 50 are inserted. In the current embodiment, first bolt holes 111 are formed in edge portions of the upper support plate 11 for coupling with the connection part 13.

Referring to FIGS. 4 and 7, the lower support plate 12 is disposed under the upper support plate 11 with a gap therebetween and includes a plurality of second insertion holes 142 corresponding to the first insertion holes 141, respectively. As described above, the first and second insertion holes 141 and 142 include the slots 143.

The connection part 13 connects the upper support plate 11 and the lower support plate 12. In the current embodiment, the connection part 13 is a flange formed in one piece with the lower support plate 12. Referring to FIG. 4, specifically, the connection part 13 includes support beams 131, inner flanges 132, and an outer flange 133.

The support beams 131 extend vertically from edge portions of the lower support plate 12. Referring to FIG. 7, the support beams 131 extend vertically upward from some regions of the lower support plate 12. In the current embodiment, first air passages 136 are formed in the lower support plate 12 and the connection part 13, and the support beams 131 are formed in regions of the lower support plate 12 in which the first air passages 136 are not formed. Second air passages 112 communicating with the first air passages 136 are formed in the upper support plate 11.

The inner flanges 132 extend inward from upper end portions of the support beams 131. In the current embodiment, second bolt holes 134 are formed in the inner flanges 132 at positions corresponding to the first bolt holes 111 of the upper support plate 11. The upper support plate 11 is placed on the inner flanges 132 and then coupled to the inner flanges 132. In the current embodiment, the upper support plate 11 and the inner flanges 132 are bolted together.

The outer flange 133 extends outward from the upper end portions of the support beams 131. In the current embodiment, a shroud shell 70 is placed on the outer flange 133 and coupled to the outer flange 133. The shroud shell 70 is an outermost structure disposed around the upper support plate 11 for accommodating reactor upper structures provided above an upper side of the nuclear reactor.

The reactor upper structures refer to various structures provided above an upper side of a reactor head 60. Examples of the reactor upper structures include a cooling fan 80 for cooling the control element drive mechanisms 50, the shroud shell 70 for accommodating the reactor upper structures and providing cooling-air flow passages, a lifting device 90 for lifting the reactor upper structures, a cable device (not shown) for supplying power to the control element drive mechanisms 50, and the anti-seismic apparatus for the anti-seismic design of the control element drive mechanisms 50. That is, the anti-seismic apparatus of the embodiment is one of the reactor upper structures because the anti-seismic apparatus is also disposed above the upper side of the reactor head 60. In the current embodiment, third bolt holes 135 are formed in the outer flange 133 for coupling with the shroud shell 70. That is, the outer flange 133 and the shroud shell 70 are bolted together.

The bushings 20 are inserted between outer surfaces of the control element drive mechanisms 50 and inner surfaces of the insertion holes 14. The bushings 20 are used to reduce gaps between the control element drive mechanisms 50 and the anti-seismic support plate 10. Since the bushings 20 maintain the gaps between the control element drive mechanisms 50 and the anti-seismic support plate 10 constant, the control element drive mechanisms 50 and the anti-seismic support plate 10 are not excessively impacted during an earthquake.

Referring to FIGS. 8 and 9, in the current embodiment, each of the bushings 20 includes a rest part 21 and an insertion part 22.

The rest part 21 is rested on an upper surface of the anti-seismic support plate 10. That is, the rest part 21 is placed on the upper surface of the anti-seismic support plate 10. In the current embodiment, the rest part 21 and the anti-seismic support plate 10 are bolted together. Fourth bolt holes 211 are formed in the rest part 21. However, the method of fastening together the rest part 21 and the anti-seismic support plate 10 is not limited to the bolting method. For example, the rest part 21 and the anti-seismic support plate 10 may be welded together.

The insertion part 22 extends downward from the rest part 21 for insertion into the insertion hole 14. The insertion part 22 and the rest part 21 are formed in one piece.

The bushing 20 includes an opening 27 formed in a side thereof. The bushing 20 is inserted in such a manner that the opening 27 faces the slot 143 of the insertion hole 14, and a terminal box provided on the control element drive mechanism 50 is disposed in the opening 27.

The bushing 20 includes a first inner diameter part 23 and a second inner diameter part 24.

The first inner diameter part 23 has a first inner diameter R1 inside the bushing 20.

The second inner diameter part 24 is disposed below the first inner diameter part 23 and has a second inner diameter R2 that is smaller than the first inner diameter R1 of the first inner diameter part 23. A rest surface 25 is formed between the first inner diameter part 23 and the second inner diameter part 24. That is, an inner surface of the bushing 20 has a two-diameter structure formed by the first inner diameter part 23 and the second inner diameter part 24, and a jaw is formed between the first inner diameter part 23 and the second inner diameter part 24 to define the rest surface 25 for placing a gasket 100 (described later) thereon.

An inner surface of the second inner diameter part 24 is separate from the outer surface of the control element drive mechanism 50. The inner surface of the second inner diameter part 24 is spaced apart from the control element drive mechanism 50 by a distance allowing for thermal expansion of the control element drive mechanism 50, the bushing 20, and the anti-seismic support plate 10.

The gasket 100 is provided to prevent abrasion and wear of the bushing 20 and the control element drive mechanism 50 when the nuclear reactor vibrates during operation, for example, during a coolant-circulating operation.

In detail, the gasket 100 is placed on the rest surface 25 in such a manner that an outer surface of the gasket 100 may make contact with the inner surface of the first inner diameter part 23 and an inner surface of the gasket 100 may make contact with the outer surface of the control element drive mechanism 50.

In addition, a slope 26 is formed on a lower end portion of the bushing 20. The slope 26 is formed to easily insert the control element drive mechanism 50.

In the current embodiment, the anti-seismic apparatus for control element drive mechanisms includes first and second anti-seismic support ring beams 31 and 32 and anti-seismic supports 40. The first and second anti-seismic support ring beams 31 and 32, and the anti-seismic support plate 10 are provided to reinforce the reactor upper structures.

In the current embodiment, two anti-seismic support ring beams (the first and second anti-seismic support ring beams 31 and 32) are described. However, the number of anti-seismic support ring beams is not limited thereto. For example, one or more anti-seismic support ring beams may be provided.

Referring to FIGS. 4 and 5, the first anti-seismic support ring beam 31 is disposed under the outer flange 133 along the circumference of the lower support plate 12. The second anti-seismic support ring beam 32 is disposed under the first anti-seismic support ring beam 31. In the current embodiment, the first and second anti-seismic support ring beams 31 and 32 have a ring shape and a rectangular cross-sectional shape.

Reinforcement plates 33 are disposed between the first and second anti-seismic support ring beams 31 and 32. The reinforcement plates 33 are vertically connected between the first and second anti-seismic support ring beams 31 and 32 to increase the structural rigidity of the first and second anti-seismic support ring beams 31 and 32.

During earthquakes, the anti-seismic supports 40 transmit impactive forces from the anti-seismic support plate 10 and the first and second anti-seismic support ring beams 31 and 32 to a wall surrounding the nuclear reactor. That is, the anti-seismic supports 40 form impact transmission paths together with the anti-seismic support plate 10 and the first and second anti-seismic support ring beams 31 and 32.

An end portion of each of the anti-seismic supports 40 is jointed between the first anti-seismic support ring beam 31 and the second anti-seismic support ring beam 32, and the other end portion is jointed to the wall surrounding the nuclear reactor.

In detail, each of the anti-seismic supports 40 includes a lug 41, an upper clevis 42, a support rod 43, a lower clevis 44, a bracket 45, and length adjustment nuts 46.

The lug 41 includes a coupling portion 411 and a support portion 412. The coupling portion 411 is inserted and fixed between the first anti-seismic support ring beam 31 and the second anti-seismic support ring beam 32, and the support portion 412 is coupled to the upper clevis 42 and supports the upper clevis 42. The support portion 412 and the upper clevis 42 are coupled by a first pin 47.

The upper clevis 42 includes an insertion groove 422 to receive the lug 41, and the support portion 412 of the lug 41 is inserted into the insertion groove 422 and fixed using the first pin 47. The upper clevis 42 includes a first joint hole 421 to receive the support rod 43. The upper clevis 42 includes first coupling holes 423 to receive the first pin 47.

An end portion of the support rod 43 is coupled to the upper clevis 42, and the other end portion of the support rod 43 is coupled to the lower clevis 44. A grip groove 431 is formed in an outer surface of the support rod 43 so that the support rod 43 may be smoothly rotated by gripping the support rod 43 at the grip groove 431 with a rotating tool.

The lower clevis 44 includes a second joint hole 441 to receive the support rod 43. The lower clevis 44 includes a protrusion 442, and the protrusion 442 is inserted into the bracket 45 (described later). After the protrusion 442 is inserted into the bracket 45, a second pin 48 is coupled to the lower clevis 44. The protrusion 442 includes a second coupling hole 443 to receive the second pin 48.

The bracket 45 is fixed to the wall surrounding the nuclear reactor and supports the lower clevis 44. The bracket 45 includes an insertion groove 451 that is greater than a shaft part of the second pin 48, and a joint groove 452 to receive the protrusion 442 of the lower clevis 44.

The length adjustment nuts 46 are coupled to the end portion and the other end portion of the support rod 43. Screw threads are formed on the first joint hole 421 and the first joint hole 441 in opposite directions. If the support rod 43 is rotated, the length of the support rod 43 inserted into the upper clevis 42 and the lower clevis 44 varies.

Referring to FIG. 10, when each of the anti-seismic supports 40 is installed, the length of the support rod 43 may be properly set by rotating the support rod 43 according to the distance between the lug 41 and the bracket 45. In detail, if the support rod 43 is rotated in a state shown on the right side of FIG. 10, the lower clevis 44 may be pulled. The insertion groove 451 has a margin so that the second pin 48 may be pulled toward the upper clevis 42 by a shortened length of the support rod 43.

After the length of the support rod 43 is set, the length adjustment nuts 46 are rotated until the length adjustment nuts 46 are brought into contact with the upper clevis 42 and the lower clevis 44, so as to prevent variation of the length of the support rod 43. Here, the length of the support rod 43 means a length of the support rod 43 that is exposed to the outside of the upper clevis 42 and the lower clevis 44.

As described above, according to the embodiment, since the anti-seismic support plate 10 of the anti-seismic apparatus for control element drive mechanisms is provided in a one-piece structure, the anti-seismic apparatus may be easily manufactured and installed and impact transmission paths may be constantly maintained even though thermal expansion occurs. That is, in the related art, anti-seismic support plates are individually used. Therefore, if the anti-seismic support plates are thermally deformed, surface contacts between neighboring anti-seismic support plates are not constantly maintained, and thus impact transmission paths are not constantly maintained. However, these problems may easily be solved by the embodiment.

Furthermore, since the anti-seismic support plate 10 includes the upper support plate 11 and the lower support plate 12, transverse movements of the control element drive mechanisms 50 may be effectively reduced even if a great earthquake occurs.

In addition, since the gaps between the bushings 20 and the control element drive mechanisms 50 are constantly maintained, the control element drive mechanisms 50 may be effectively protected from excessive impactive forces, and the gaskets 100 may prevent wear of the bushing 20 and the control element drive mechanisms 50.

In addition, the anti-seismic support ring beams 31 and 32 and the anti-seismic supports 40 may improve structural stability against earthquakes.

As described above, according to the one or more of the above exemplary embodiments, the control element drive mechanisms may be supported by the integral anti-seismic support plate of the anti-seismic apparatus, and thus excessive transverse movements of the control element drive mechanisms may be prevented.

In addition, owning to the integral anti-seismic support plate, the anti-seismic apparatus may be easily manufactured and installed. In addition, the reactor upper structures including the anti-seismic apparatus may be simply designed.

In addition, since the anti-seismic support plate is formed in one piece, problems of load transmission passages caused by misalignment of anti-seismic support plates may be prevented. That is, if anti-seismic support plates are individually used like in the related art, the anti-seismic support plates may not be precisely aligned, and thus load transmission passages may cause problems. However, according to the embodiments, such problems may be effectively solved.

In addition, since the anti-seismic support plate includes the upper support plate and the lower support plate, transverse movements of the control element drive mechanisms may be effectively reduced even if a great earthquake occurs. In addition, if the distance between the upper plate and the lower plate properly varies according to geographical characteristics of a place on which the anti-seismic apparatus for control element drive mechanisms is installed, earthquakes may be coped with more effectively.

In addition, since the gaps between the control element drive mechanisms and the anti-seismic support plate are constantly maintained using the bushings, impactive forces may not be excessively generated during earthquakes.

In addition, the gaskets disposed between the bushings and the control element drive mechanisms may prevent constant abrasion and wear of the bushings and the control element drive mechanisms.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An anti-seismic apparatus provided for an anti-seismic design of a plurality of control element drive mechanisms of a nuclear reactor, the anti-seismic apparatus comprising:
   an anti-seismic support plate comprising a plurality of insertion holes in which the control element drive mechanisms are respectively inserted; and
   bushings inserted between outer surfaces of the control element drive mechanisms and inner surfaces of the insertion holes,
   wherein the anti-seismic support plate includes:
      a lower support plate comprising a plurality of second insertion holes at positions corresponding to the first insertion holes, the lower support plate being disposed under the upper support plate with a gap therebetween; and
      a connection part connecting the upper support plate and the lower support plate, and wherein the connection part includes:
      a support beam vertically extending from an end portion of the lower support plate;
      an inner flange extending inward from an upper end portion of the support beam; and
      an outer flange extending outward from the upper end portion of the support beam.

2. The anti-seismic apparatus of claim 1, wherein the connection part is a flange formed in one piece with the lower support plate.

3. The anti-seismic apparatus of claim 1, wherein each of the bushings comprises:
   a rest part placed on an upper surface of the anti-seismic support plate; and
   an insertion part extending downward from the rest part and inserted into the insertion hole,
   wherein each of the inner surfaces of the bushings comprises:
   a first inner diameter part formed on an upper side and having a first inner diameter; and
   a second inner diameter part disposed below the first inner diameter part and having a second inner diameter that is smaller than the first inner diameter,
   wherein a rest surface is formed between the first inner diameter part and the second inner diameter part.

4. The anti-seismic apparatus of claim 3, wherein the rest part and the anti-seismic support plate are bolted together.

5. The anti-seismic apparatus of claim 3, wherein an inner surface of the second inner diameter part and the outer surface of the control element drive mechanism are spaced apart from each other to allow thermal expansion.

6. The anti-seismic apparatus of claim 3, wherein a gasket is placed on the rest surface in such a manner that an outer surface of the gasket makes contact with an inner surface of the first inner diameter part and an inner surface of the gasket makes contact with the outer surface of the control element drive mechanism.

7. The anti-seismic apparatus of claim 1, wherein a slope is formed on a lower end inner surface of each of the bushings to form a downwardly increasing inner diameter.

8. The anti-seismic apparatus of claim 1, wherein each of the bushings comprises an opening in a side thereof.

9. The anti-seismic apparatus of claim 1, wherein the upper support plate is placed on the inner flange and coupled to the inner flange, and
   a shroud shell disposed around the upper support plate to accommodate reactor upper structures provided on an upper side of the nuclear reactor is placed on the outer flange and coupled to the outer flange.

10. The anti-seismic apparatus of claim 9, wherein the upper support plate and the inner flange are bolted together, and the shroud shell and the outer flange are bolted together.

11. The anti-seismic apparatus of claim 1, wherein a first anti-seismic support ring beam is disposed under the outer flange along a circumference of the lower support plate, and
    a second anti-seismic support ring beam is disposed under the first anti-seismic support ring beam.

12. The anti-seismic apparatus of claim 11, wherein a reinforcement plate is inserted between the first anti-seismic support ring beam and the second anti-seismic support ring beam.

13. The anti-seismic apparatus of claim 11, further comprising an anti-seismic support, the anti-seismic support having an end portion coupled between the first and second anti-seismic support ring beams and the other end portion coupled to a wall surrounding the nuclear reactor.

14. The anti-seismic apparatus of claim 13, wherein the anti-seismic support comprises:
    a lug coupled between the first anti-seismic support ring beam and the second anti-seismic support ring beam;
    an upper clevis coupled to the lug by a first pin and comprising a first joint hole on which a screw thread is formed in a first direction;
    a support rod having an end portion coupled to the first joint hole;
    a lower clevis to which the other end portion of the support rod is coupled, the lower clevis comprising a second joint hole on which a screw thread is formed in a direction opposite to the first direction;
    a bracket fixed to the wall surrounding the nuclear reactor, the lower clevis being coupled to the bracket by a second pin; and
    length adjustment nuts respectively coupled to the end portion and the other end portion of the support rod.

15. An anti-seismic apparatus provided for an anti-seismic design of a quality of control element drive mechanisms of a nuclear reactor, the anti-seismic apparatus comprising:
    an anti-seismic support plate comprising a plurality of insertion holes in which the control element drive mechanisms are respectively inserted; and
    bushings inserted between outer surfaces of the control element drive mechanisms and inner surfaces of the insertion holes,
    wherein the anti-seismic support plate includes:
       an upper support plate comprising a plurality of first insertion holes;
       a lower support plate comprising a plurality of second insertion holes at positions the upper support plate with a gap therebetween; and a connection part connecting the upper support plate and the lower support plate, wherein the connection part is a flange formed in one piece with the lower support plate, and wherein a first air passage is formed in the lower support plate, and a second air passage communicating with the first air passage is formed in the upper support plate.

* * * * *